Sept. 20, 1938. G. W. PRESTON 2,130,698
FEED MECHANISM FOR METAL SPRAY
Filed May 17, 1937 2 Sheets-Sheet 1

INVENTOR:
GEORGE W. PRESTON
BY
ATTORNEY.

Sept. 20, 1938. G. W. PRESTON 2,130,698
FEED MECHANISM FOR METAL SPRAY
Filed May 17, 1937 2 Sheets-Sheet 2
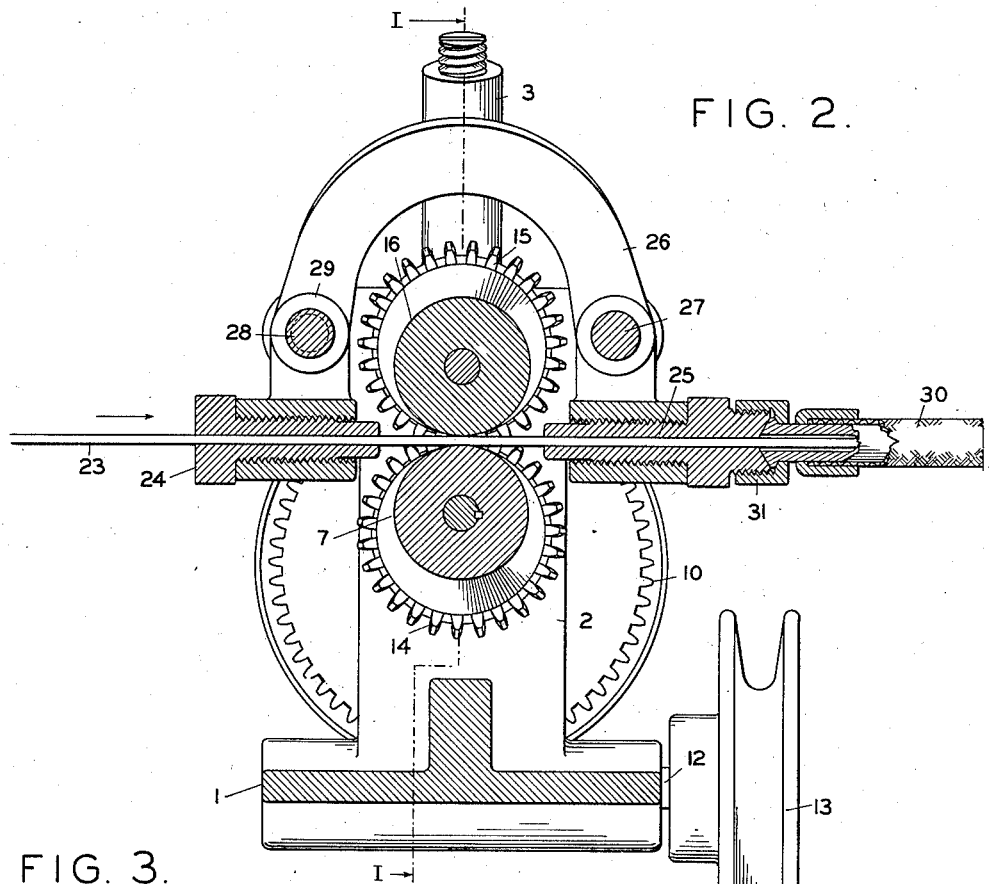
FIG. 2.
FIG. 3.
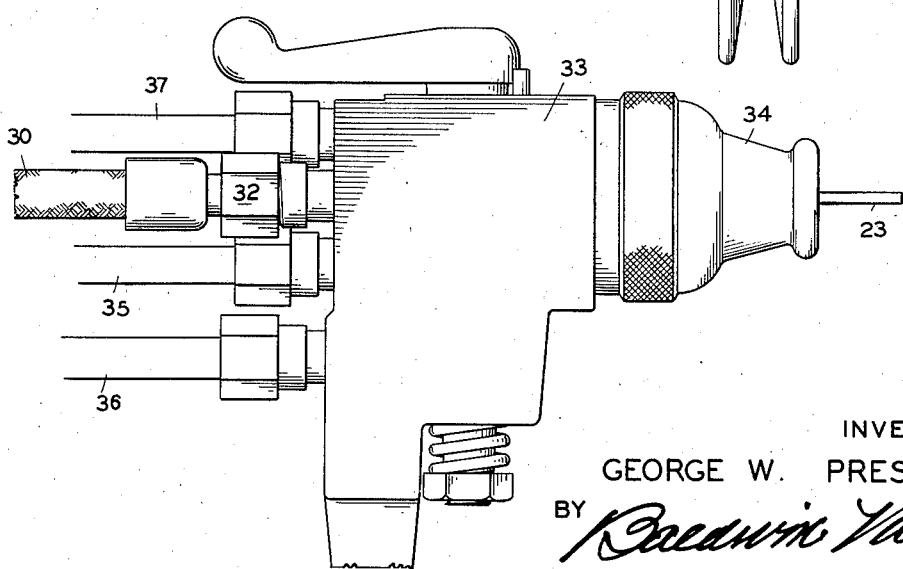
INVENTOR:
GEORGE W. PRESTON
BY *Baldwin Vale*
ATTORNEY Patented Sept. 20, 1938

2,130,698

UNITED STATES PATENT OFFICE 2,130,698

FEED MECHANISM FOR METAL SPRAY

George W. Preston, San Leandro, Calif.

Application May 17, 1937, Serial No. 143,033

3 Claims. (Cl. 91—12.2)

This invention relates to improvements in metal spray apparatus, and more particularly to the wire feed mechanism thereof.

In this art, metal is fused and while in a molten state is picked up by a blast of air from a blow pipe and deposited upon the surface to be coated. Heretofore, there has been much difficulty in maintaining the calibrated feed of metal through the fusing means, resulting in lack of uniformity in the ultimate coating deposited.

Among the objects of the present invention is to provide means for regulating and maintaining a uniform feed of the fusible wire to the blow torch or other fusing means.

Another object is to increase the mobility of the apparatus by separating the feed mechanism from the blow torch.

Another object is to provide for uniform texture and distribution where it is desired to build up a considerable depth of superimposed layers of the sprayed metal.

Another object is to adapt the invention to continuous use for long periods of time with a positive uniformity in the ultimate product.

A further object is to provide an apparatus adapted to melting and spraying relatively hard metals such as high carbon steel and the harder alloys, serving as a "putting on tool" for rebuilding worn shafts, bearings, feed rolls, and the like.

Other objects and advantages will appear as the description progresses.

In this specification and the accompanying drawings, the invention is disclosed in its preferred form. But it is to be understood that it is not limited to this form, because it may be embodied in other forms within the purview of the claims following the description.

In the two sheets of drawings:

Fig. 2 is a similar section taken from the side on the line II—II Fig. 1.

Fig. 3 is a side elevation of the blow torch head constructed in accordance with this invention, and to be read in conjunction with Fig. 2.

Figure 1:
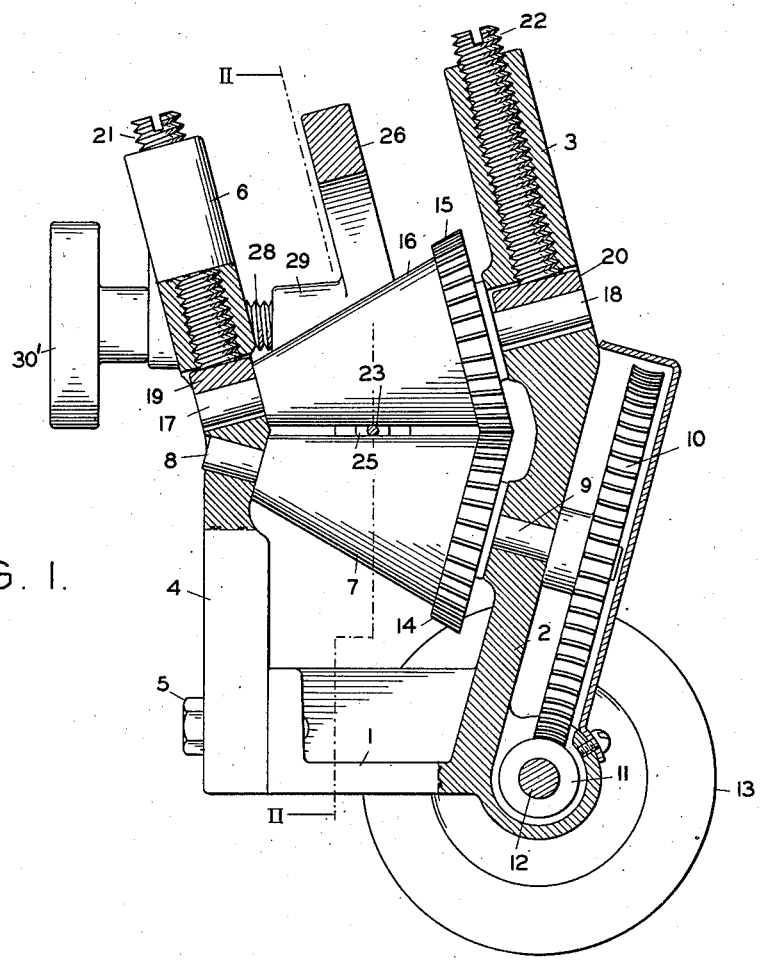
Fig. 1 is a vertical section taken on the line I—I Fig. 2 of a wire feed mechanism constructed in accordance with this invention.

In detail, the construction illustrated in the drawings, referring first to Fig. 1, comprises the frame of the feed mechanism, the base 1 of which is adapted to be fixed to a portable truck, not shown, and adapted to carry oxygen and acetylene tanks and the reel of wire. This base 1 has the upright standard 2 with its tubular upper portion 3. The bracket 4 is bolted to the base 1 by the cap screws 5 and also terminates in a tubular portion 6.

The driven feed roll 7 is keyed to a shaft having the ends 8 and 9 respectively journaled in the upright 2 and the bracket 4. The driven gear wheel 10 is fixed upon the end 9 and is enmeshed with the worm gear 11 fixed on the countershaft 12 of the driven pulley 13.

The driven feed roll 7 has the bevel gear 14 cut therein and enmeshed with a similar gear 15 on the opposed feed roll 16, which is free upon a shaft, the opposite ends 17 and 18 of which rest in their respective saddle bearings 19, 20 which respectively bear against the spindles 21, 22 threaded in the tubular portions 3 and 6 of the frame. The feed rolls 7 and 16 being of like taper, their peripheries meet on parallel lines to engage the interposed wire 23, traction pressure against which is regulated by the spindles 21 and 22.

Referring to Fig. 2, this wire passes through the guides 24 and 25 on the opposite ends of the yoke 26 which slides on the guide rod 27 extending between the portions 2 and 4 of the frame. The threaded spindle 28 is swiveled in the frame 2—4 and is threaded through the hub 29 on the yoke 26 whereby turning of the spindle 28 by means of the hand knob 30' will advance or retract the guides 24 and 25 to shift the wire 23 with respect to the variable diameters of the feed rolls 7 and 16, to increase or diminish the rate of speed of the wire as desired.

From the guide 25 the wire passes into the flexible tube 30 attached to the guide by means of the coupling 31. This tube 30 has a metallic lining with a protective outer sheath to provide the necessary flexibility without exerting undue friction upon the wire 23 passing therethrough.

Referring now to Fig. 3: The other end of this tube 30 is attached by the coupling 32 to the head 33 of the blow torch through which the wire passes and projects beyond the mixing tip 34. The flexible hoses 35 and 36 respectively conduct acetylene gas and oxygen under pressure to intercepting passages through the head 33 where they are thoroughly intermixed before emerging from the tip 34 surrounding the end of the wire 23. When ignited at this point, the intense heat rapidly brings the end of the wire to a state of fusion. Compressed air, delivered to the head 33 through the flexible hose 37, emerges at high velocity through the tip 34 picking up the fused molecules of the metal 23 forming an atomized metal spray which mechanically adheres to any surface it may strike within the range of the high velocity of the blast from the tip 34.

The driven pulley 13 is mounted on a shaft of a motor (not shown). The speed of the pulley 13 and the feed rolls 7 and 16 is maintained constant by the predetermined speed of the motor.

It has been common practice, heretofore, to incorporate the wire feed mechanism within the head 33; in addition to the added weight and inconvenience to the operator of this practice, it is not practical within these limits to provide a feed mechanism of sufficient reliability and stability for the purpose. Feeding by remote control as described herein eliminates the disadvantages enumerated and assures the necessary tension between the feed rolls 7 and 16 to provide a continuous feed. There is the further advantage that the length of wire extending from the remote feed to the tip 34 provides a certain degree of compensating tension for any slight variation in speed that may occur in the feeding mechanism, before it is manifest at the end 23.

It is comparatively easy to regulate the volume of a welding torch to fuse a given amount of metal under static conditions. But in the present art it has heretofore been very difficult to maintain a calibrated and uniform feed of wire proportional to the volume of heat generated by the torch at 34. If the wire feed slows up, the proper amount of metal will not be sprayed; and if the feed speeds up, the metal will not be properly fused for spraying.

To operate successfully, an apparatus of this character must be very carefully adjusted; the proportion of acetylene and oxygen must be exact, and the velocity and volume of the compressed air blast must be determined and fixed with respect to the capacity of the torch. The feed of the wire 23 must be maintained with precision throughout relatively long periods of time. Wires of various gauges and melting points may be used, requiring wires having a low melting point to be fed more rapidly than those having a high melting point to maintain the maximum capacity of the apparatus. Obviously, the capacity of the torch can be regulated according to the melting point of the wire. In fact, sensitiveness to adjustability is one of the major advantages of the present invention. The micrometric adjustment of the wire feed by means of the knob 30' gives the operator positive control over the wire feed to insure precision in production.

This invention operates substantially as follows: For example, a worn shaft is to be built up to the desired diameter. The first step is to center the shaft in the lathe and take off a rough cut of the area to be treated. This is preferably done with a V pointed tool so sharpened that it will tear the fibers of the shaft leaving a rough superficial area for the reception of the metal spray. The cutting tool is then removed from the traveling tool carriage of the lathe and the torch 33 is substituted. With the tip 34 directed away from the work to be performed, the torch flame, the air blast and the wire feed are accurately adjusted with respect to each other, after which the tip 34 is pointed directly at the rough portion of the shaft and the automatic feed started so that the metal spray travels along the shaft the desired distance where it is then reversed, traveling thus back and forth until the desired thickness of metal is deposited upon the worn portion of the shaft. The fused particles of the sprayed metal form a coating which adheres with great tenacity to the roughened surface of the previously treated shaft. The deposit presents a superficially rough surface; the shaft is then ground in the usual manner to bring it down to the exact diameter required. Thus finished the metal deposit presents a surface of uniform texture slightly porous.

For treating large areas the torch head 33 may be manually controlled for spraying the molten metal on fabrics, metal, wood, or any surface to which it will adhere. The metal particles are relatively cool when they strike the surface and will not burn it. In this manner decorative and protective coatings may be deposited.

The feed mechanism has been disclosed in its application to the conventional gas welding torch, but it is equally adaptable to feeding wire to an electric arc fusing unit in combination with an air blast, with like results.

Having thus described this invention, what I claim and desire to secure by Letters Patent is:

1. A wire feed mechanism for metal spray apparatus comprising opposed feed rolls tapered in the same direction and driven in unison; and a wire guide movable substantially in line with the meeting line of said feed rolls.

2. A wire feed mechanism for metal spray apparatus comprising opposed feed rolls tapered in the same direction and driven in unison; a guide rod and a threaded spindle substantially parallel with the meeting line of said rolls; wire guides on opposite sides of said rolls and joined by a yoke engaging said guide and spindle; and means for rotating said spindle.

3. A wire feed mechanism for metal spray apparatus comprising opposed feed rolls tapered in the same direction and driven in unison; a threaded spindle substantially parallel with the meeting line of said rolls; a wire guide engaging said spindle; and means for rotating said spindle.

GEORGE W. PRESTON.